June 15, 1926. 1,588,683
B. JORGENSEN
BRAKE MECHANISM
Filed Dec. 12, 1923
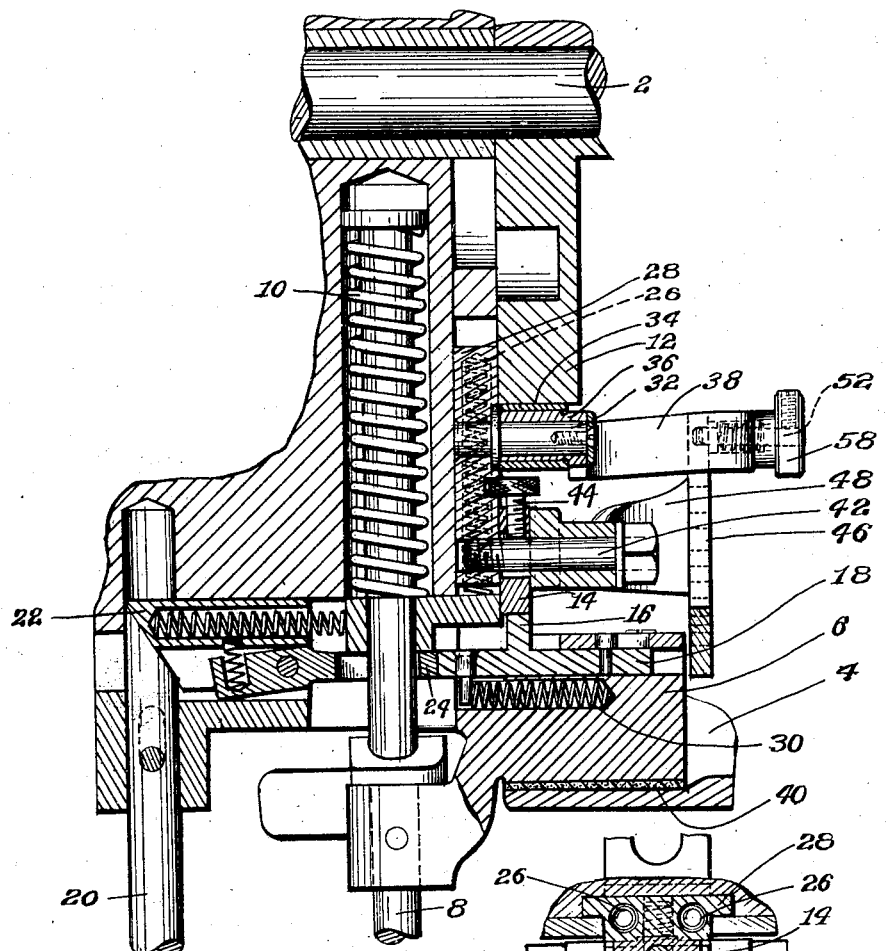
Fig. 1
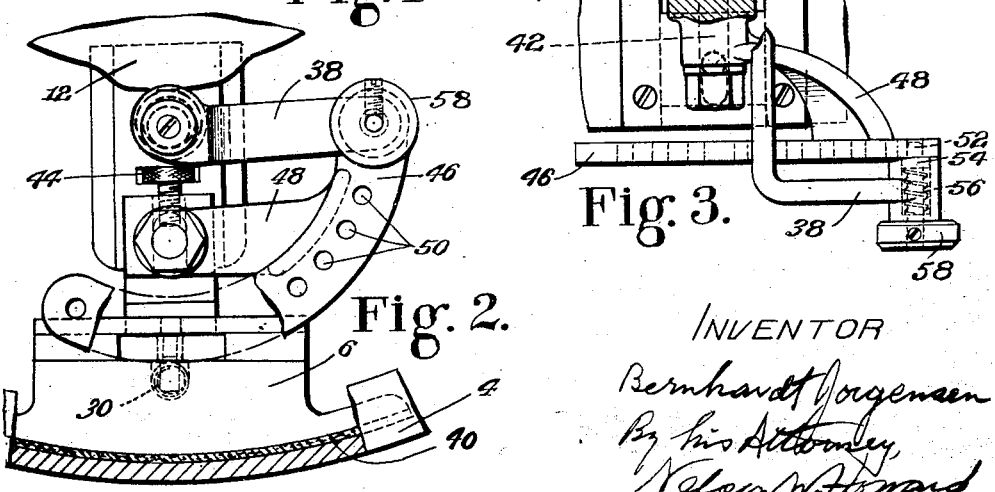
Fig. 2.
Fig. 3.
INVENTOR
Bernhardt Jorgensen
By his Attorney,
Nelson W. Howard Patented June 15, 1926.

1,588,683

UNITED STATES PATENT OFFICE.

BERNHARDT JORGENSEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

BRAKE MECHANISM.

Application filed December 12, 1923. Serial No. 680,239.

This invention relates to brake mechanism, and is herein illustrated in its application to starting and stopping means of the type shown in Letters Patent No. 791,986 granted on June 6, 1905 upon an application of R. F. McFeely, that type of starting and stopping means being extensively used in machines for pulling uppers over lasts in the manufacture of shoes. It is to be understood, however, that the invention is not limited in its applicability to machines for performing any particular kind of work, nor to mechanism of the particular type illustrated in said patent.

In the operation of the starting and stopping means shown in said McFeely patent the brake is applied automatically by a cam to stop the machine, the cam having a fixed throw for moving the brake the same distance each time that it is applied, and the brake mechanism comprises parts that are relatively adjustable to compensate for wear of the brake shoe, the latter being provided with a leather facing which has to be replaced when worn out. Much difficulty has been experienced heretofore in making this adjustment of the brake by reason of the fact that the parts requiring adjustment are not readily accessible, a difficulty which is materially increased where pulling-over machines are positioned, as they often are, back to back so that their pulleys and the brake mechanisms associated therewith are close together. Moreover, to make the right amount of adjustment to render the brake properly effective, without unduly increasing the braking pressure, has called heretofore for the exercise of considerable care and judgment, since the construction has not been such as to afford any definite indication of the differences between different settings; and it has also not been easy, many times, to determine whether the leather facing of the brake shoe was so far worn as to need to be replaced. For these reasons it has been the practice in shoe factories, when conditions required adjustment of the brake of a pulling-over machine, to send for a skilled mechanic familiar with that type of machine to make the adjustment. This has frequently resulted in considerable delay, inconvenience and expense.

The present invention provides brake mechanism so constructed that the brake may be readily and quickly adjusted by anyone, without the need for any special skill or familiarity with the design of the machine, the construction shown comprising a conveniently accessible member that requires only to be turned to effect the adjustment. An important feature also comprises means which relieves the operator substantially of all concern as to the proper amount of adjustment to make. Conveniently this feature is shown as embodied in a segment provided with a series of holes to receive a pin carried by the rotatable adjusting member, successive holes being spaced apart the distance that the member should be turned ordinarily in making the adjustment when conditions indicate that adjustment is needed. A further important advantage of such an arrangement is that it can be determined at a glance how much the brake has been taken up and whether the facing of the brake shoe has been worn to such an extent as to require replacement. As an aid to this, the number of intervals between successive stopping positions of the adjusting member may, as herein shown, be made equal to the number of adjustments that can be made before the facing needs to be replaced.

The above and other features of the invention, including various novel details of construction and combinations of parts, will now be more particularly described by reference to the accompanying drawings and pointed out in the claims.

In the drawings:—

Fig. 1 is a view in vertical section of starting and stopping mechanism of the type illustrated in the prior patent above mentioned, with the features of the present invention applied thereto;

Fig. 2 is a right-hand side elevation of a portion of the structure shown in Fig. 1 with parts broken away; and Fig. 3 is a plan view of a portion of the structure shown in Fig. 2 with parts in horizontal section.

Starting and stopping mechanism of the type herein illustrated comprises means for imparting movement to a driven member, such as a cam shaft 2, through a driven element or pulley 4 connected by means of a clutch (not shown) to the source of power. To stop the machine there is provided a brake shoe 6 for engaging the inner face of the pulley 4, the brake shoe being fast on a vertical rod 8 connected at its lower end to the clutch, so that when the rod is moved upwardly by a spring 10 the brake is released and the clutch is set to start the machine, and when the rod is moved reversely against the resistance of the spring 10 the clutch is released and the brake is applied to stop the machine. The last-named movement of the rod 8 is effected by means of a peripheral cam 12 on the shaft 2, this cam acting through connections hereinafter described to impart downward movement to a member 14 which bears on a lug 16 formed on a horizontal slide 18 mounted in the brake shoe 6. To start the machine, the slide 18 is moved to the right far enough to release the lug 16 from the member 14, thus releasing the brake shoe and the rod 8 to the action of the spring 10. Such movement is imparted to the slide 18 by means of a treadle-operated rod 20 in wedging engagement with a horizontal spring-controlled slide 22 which carries a member 24 engaging the left-hand end of the slide 18. In the course of the cycle of operations of the machine the cam 12 arrives in position to permit the member 14 to be moved upwardly by the action of springs 26 mounted in a cam-slide 28 to which the member 14 is secured, so as to clear the lug 16 and permit the slide 18 to be moved to the left by its spring 30 to carry the lug 16 again under the member 14. Thereafter, at the time in the cycle predetermined by the shape of the cam 12, the member 14 is again moved downwardly to depress the brake shoe and release the clutch. For a more detailed description of this general organization reference may be made to the patent hereinbefore mentioned.

For transmitting movement from the cam 12 to the slide 28 and the brake shoe, the slide carries a stud 32 encircled by a cam-roll or sleeve 34 upon which the cam bears. In accordance with the present invention there is mounted on the stud 32 within the sleeve 34 an eccentric 36 provided with a hand lever or arm 38 for turning it. It will be seen that by this means, in cooperation with the springs 26, the slide 28 may be moved up or down relatively to the cam 12 and the amount of pressure applied by the brake shoe to the pulley 4 may thus be varied. It is customary to provide the brake shoe with a leather facing 40 which may be replaced when worn out; and in the construction shown the eccentric 36 has a throw corresponding substantially to that portion of the thickness of the leather facing which is worn away before the facing needs to be replaced. When the facing is new the low part of the eccentric will be positioned opposite to the cam 12, and as the facing wears away the eccentric will be turned by the arm 38 in successive steps to compensate for the wear, until ultimately its highest part is opposite to the cam. Thereafter, when the brake gives evidence of inefficiency, a new leather facing is applied to the brake shoe and the eccentric is readjusted to its first position.

Preferably, as illustrated, the member 14 is mounted for vertical adjustment relatively to the slide 28 and is held in adjusted position thereon by a clamping screw 42. To assist in holding the member 14 in adjusted position, and for use in adjusting it, a screw 44 is threaded in the upper end of the member with its head mounted to turn in a slot formed in the slide 28. This adjustment, however, is intended for use only in setting up the machine. The member 14 once having been correctly positioned in relation to the slide 28, the only adjustment of the brake mechanism thereafter necessary in the normal use of the machine is that effected by the arm 38.

For holding the eccentric 36 in adjusted position there is provided a segment 46 formed on a bracket 48 secured by the clamping screw 42 to the slide 28 and provided with a series of holes 50 to receive a pin 52 in the outer end of the arm 38. The pin 52 has a collar 54 engaged by a spring 56 which is mounted in a socket in the arm 38 for holding the pin in place in any one of the holes 50, and a knob 58 is secured to the outer end of the pin for use in withdrawing the pin from the hole. The distance between any two successive holes of the series is the distance that the arm 38 should be turned to effect the proper adjustment of the brake shoe under the usual conditions. This gives the operator a definite indication of the amount of adjustment required, and the adjustment may be made even without looking at the parts, which is an advantage where machines are positioned close together. If, under some conditions, movement of the arm 38 the indicated distance should not be sufficient for the best results, the arm may of course be moved farther to bring its pin 52 into alinement with another hole of the series. When the leather facing 40 is new, the arm 38 will be positioned at one end of the segment 46, the left-hand end as the parts are viewed in Fig. 2, and as the facing wears, the arm will be advanced from time to time until finally it is at the other end of the segment. A further important advantage of this arrangement is that the position of the arm 38 affords an accurate indication of the condition of the leather facing, so that the operator may know at a glance whether a new facing is required.

Having described the invention, what I claim as new and desire to secure by Letters Patent of the United States is:—

1. In mechanism of the class described, the combination with a driven element, of a brake shoe arranged to be applied to said driven element, a slide on said brake shoe having a lug projecting therefrom, an operating member for engaging said lug to apply the brake shoe, manual means for moving said slide to release its lug from said member, a spring for withdrawing the brake shoe from operative position when the slide is thus moved, a cam-slide on which said operating member is secured, said cam-slide being movable into position to permit operative relation to be re-established between said member and lug and movable thereafter to apply the brake shoe, a cam for controlling and operating said cam-slide, and means on the cam-slide for rendering the cam effective to operate it, said means comprising an eccentric mounted for turning movement to vary the pressure applied by the brake shoe.

2. In mechanism of the class described, the combination with a driven element, of a brake shoe arranged to be applied to said driven element, a slide on said brake shoe having a lug projecting therefrom, an operating member for engaging said lug to apply the brake shoe, manual means for moving said slide to release its lug from said member, a spring for withdrawing the brake shoe from operative position when the slide is thus removed, a cam-slide on which said operating member is secured, said cam-slide being movable into position to permit operative relation to be re-established between said member and lug and movable thereafter to apply the brake shoe, a cam for controlling and operating said cam-slide, means on the cam-slide for rendering said cam effective to operate the slide comprising an eccentric mounted for turning movement to vary the pressure applied by the brake shoe, an arm for turning said eccentric, a bracket member carried by the cam-slide and positioned adjacent to said arm, and a device for locking the arm to said bracket member in any one of a series of predetermined positions of the arm for holding the eccentric in adjusted position.

3. In mechanism of the class described, the combination with a driven element, of a brake shoe arranged to be applied to said driven element, a slide on said brake shoe having a lug projecting therefrom, an operating member for engaging said lug to apply the brake shoe, manual means for moving said slide to release its lug from said member, a spring for withdrawing the brake shoe from operative position when the slide is thus moved, a cam-slide on which said operating member is secured, said cam-slide being movable into position to permit operative relation to be re-established between said member and lug and movable thereafter to apply the brake shoe, a cam for controlling and operating said cam-slide, means on the cam-slide for rendering said cam effective to operate the slide comprising a member movable relatively to said cam-slide to take up wear of the brake shoe, and a device carried by the cam-slide for holding said member in any one of a series of adjusted positions spaced at intervals determined independently of control of the operator in accordance with the extent of adjustment required at any one time.

4. In mechanism of the class described, the combination with a driven element, of a brake shoe arranged to engage said driven element, a rotatable cam member having a fixed throw for operating said brake shoe, and power transmitting connections between said member and brake shoe comprising an eccentric adjustable to vary the pressure applied by the brake shoe.

5. In mechanism of the class described, the combination with a driven element, of a brake shoe arranged to engage said driven element, a cam-slide for operating said brake shoe, a cam-roll on said slide, a cam for engaging said cam-roll, and an eccentric within said cam-roll for adjusting it to vary the pressure applied by the brake shoe.

6. In mechanism of the class described, the combination with a brake member, of means for operating said brake member comprising a slide adjustable rectilinearly to compensate for the wear of said member, a member having a predetermined range of movement for effecting adjustment of said slide in successive steps, and means associated with said last-named member for indicating the extent to which said slide has been adjusted.

7. In mechanism of the class described, the combination with a brake shoe having a replaceable facing, of means for operating said brake shoe comprising a cam-roll adjustable to compensate for the wear of said facing, a member having a range of movement corresponding substantially to the permissible wear of said facing for effecting adjustment of said cam-roll, and means for indicating by the position of said member the condition of said facing in respect to wear.

8. In mechanism of the class described, the combination with a brake shoe having a replaceable facing, of means for operating said brake shoe comprising a cam-roll adjustable to compensate for the wear of said facing, an eccentric within said cam-roll for adjusting it, an arm connected to said eccentric for turning it, and a member along which said arm is movable so constructed as to indicate by the position of the arm the condition of said facing in respect to wear.

9. In mechanism of the class described, the combination with a brake member, of means for operating said brake member comprising a slide adjustable to compensate for the wear of said member, a cam for operating said slide, an eccentric on the slide in the path of the cam and movable to effect adjustment of the slide relatively to the cam in successive steps, and mechanism associated with said eccentric for retaining it in any one of a number of adjusted positions spaced from one another at intervals determined independently of the control of the operator.

10. In mechanism of the class described, the combination with a brake member, of means for operating said brake member comprising a slide having a cam-roll thereon adjustable to compensate for the wear of said member, a cam for engaging said cam-roll to operate the slide, a device movable to effect adjustment of said cam-roll in successive steps, a member adjacent to said adjusting device having a series of openings formed therein, and a spring-controlled member carried by said device and arranged to enter any one of said openings to hold the device in adjusted position.

11. In mechanism of the class described, the combination with a brake member, of means for operating said brake member comprising a cam-roll adjustable to compensate for the wear of said member, a device movable to adjust said cam-roll, and mechanism for locking said device at intervals in its adjusting movement determined independently of the control of the operator and each corresponding to the extent of adjustment of the cam-roll required at any one time.

12. In mechanism of the class described, the combination with a brake member, of means for operating said brake member comprising a cam-slide, a cam for operating said slide, and an eccentric on the cam-slide for rendering the cam effective to operate the slide, said eccentric being adjustable to compensate for the wear of the brake member.

13. In mechanism of the class described, the combination with a brake member, of means for operating said brake member comprising a cam-slide, a cam for operating said slide, an eccentric on the cam-slide for rendering the cam effective to operate the slide, an arm for turning said eccentric to compensate for the wear of the brake member, and means for locking said arm in adjusted position.

14. In mechanism of the class described, the combination with a brake member, of means for operating said brake member comprising a cam-slide, a cam for operating said slide, an eccentric on the cam-slide for rendering the cam effective to operate the slide, said eccentric being adjustable to compensate for the wear of the brake member, an arm for turning the eccentric, a segment carried by the cam-slide and having a series of holes formed therein, and a pin carried by said arm and arranged to enter any one of said holes for holding the eccentric in adjusted position.

15. In mechanism of the class described, the combination with a brake member, of means for operating said brake member comprising a cam-slide, a cam for operating said slide, a member on the cam-slide for rendering said cam effective to operate it, a device for adjusting said member to compensate for the wear of the brake member, and retaining means cooperating with said device to lock it in adjusted position at intervals determined independently of control of the operator and each corresponding to the extent of adjustment required at any one time.

16. In mechanism of the class described, the combination with a brake shoe having a replaceable facing, of means for operating said brake shoe comprising a cam-slide, a cam for operating said slide, an eccentric on the cam-slide for rendering the cam effective to operate it, an arm connected to said eccentric for turning it, and a member carried by the cam-slide and having means co-operating with said arm to lock the arm in any one of a fixed number of adjusted positions spaced at intervals each corresponding to the extent of adjustment required at any one time and equal in number to the number of adjustments that may be made before said facing is replaced.

17. In mechanism of the class described, the combination with a brake member having a replaceable facing, of means for operating said brake member comprising a cam and an eccentric in the path of the cam, said eccentric being adjustable to compensate for the wear of said facing and having a throw corresponding substantially to the extent of such wear permissible before the facing needs to be replaced.

18. In mechanism of the class described, the combination with a brake member, of means for operating said brake member comprising a cam-slide, a cam, and a roll on the slide engaged by the cam, said roll being adjustable to compensate for wear of the brake member.

In testimony whereof I have signed my name to this specification.

BERNHARDT JORGENSEN.